United States Patent [19]

Potts

[11] 4,249,634
[45] Feb. 10, 1981

[54] SAFETY FLOATING STEP ASSEMBLY FOR PLATFORM

[75] Inventor: P. Keith Potts, Kingsport, Tenn.

[73] Assignee: Eastman Kodak Company, Rochester, N.Y.

[21] Appl. No.: 75,057

[22] Filed: Sep. 12, 1979

[51] Int. Cl.³ .............................................. B60R 3/02
[52] U.S. Cl. .......................................... 182/1; 182/91; 280/166
[58] Field of Search ................... 182/1, 91, 97, 98, 89; 280/166; 14/71.1, 2.4

[56] References Cited

U.S. PATENT DOCUMENTS

| 1,169,140 | 1/1916 | Fassett et al. | 182/91 |
| 2,498,375 | 2/1950 | Moore | 182/1 |
| 2,825,582 | 3/1958 | McDonald | 182/91 |
| 4,013,140 | 3/1977 | Pradon | 182/1 |
| 4,168,764 | 9/1979 | Walters | 182/1 |

*Primary Examiner*—Reinaldo P. Machado
*Attorney, Agent, or Firm*—Malcolm G. Dunn; Daniel B. Reece, III

[57] ABSTRACT

Safety floating step assembly for pivotal connection to platforms and the like, being self-leveling through a single pair of parallel four-bar linkages and adjustably movable to the same and different horizontal levels of position relative to the platform and to the top of different height vehicles that may be located alongside the platform and being provided with a locking mechanism for releasably locking the floating step assembly at any desired horizontal level.

5 Claims, 5 Drawing Figures

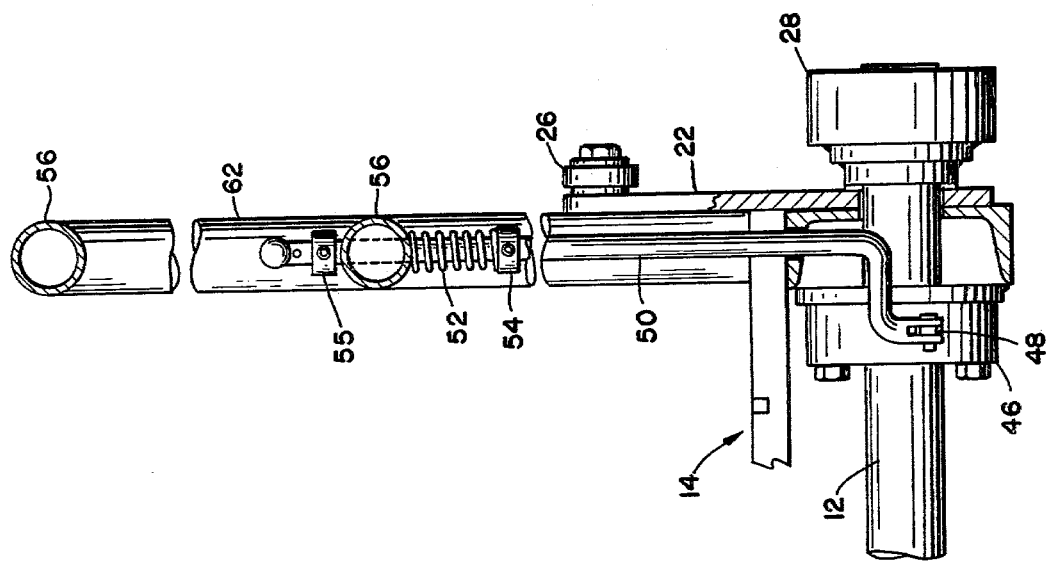
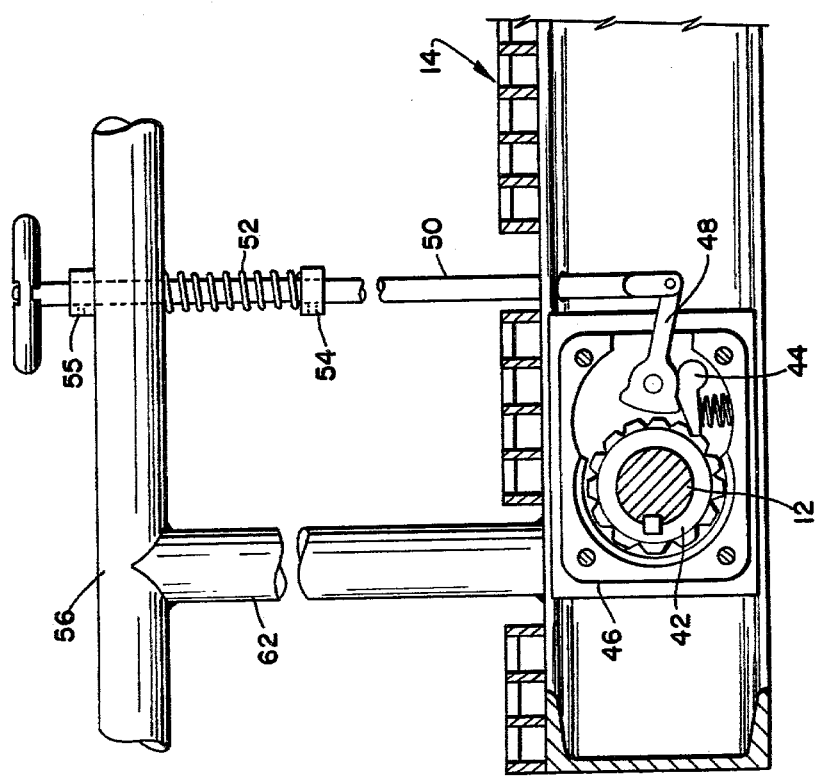

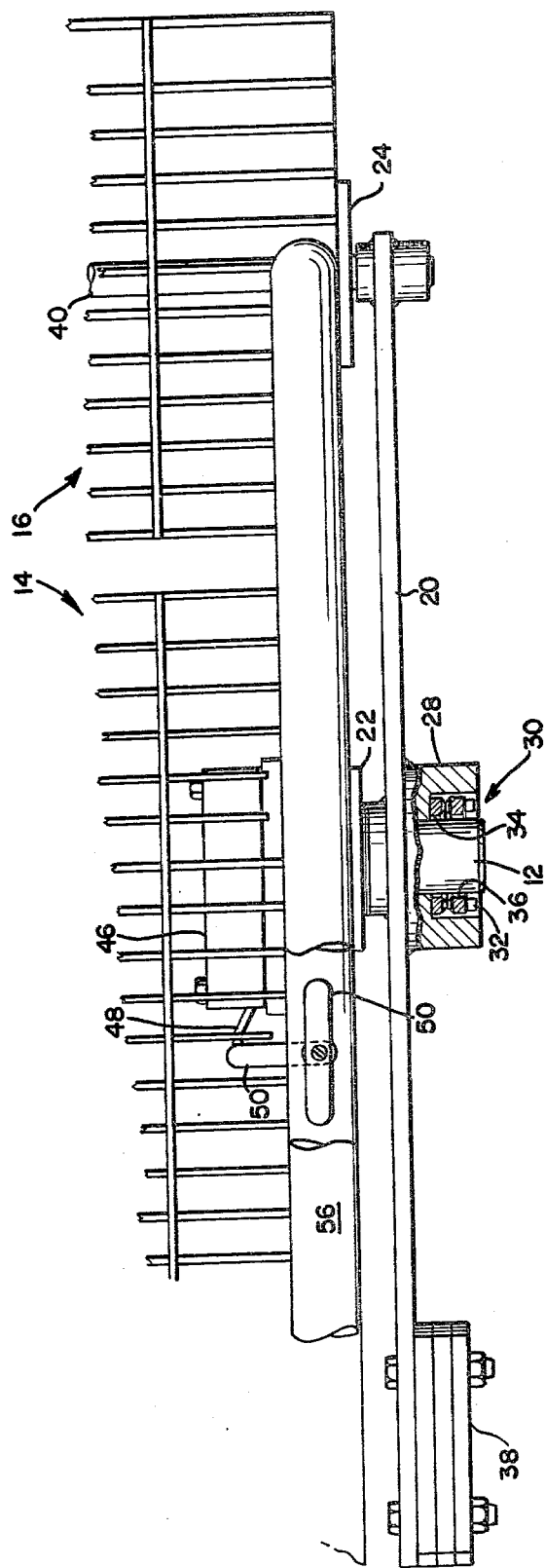
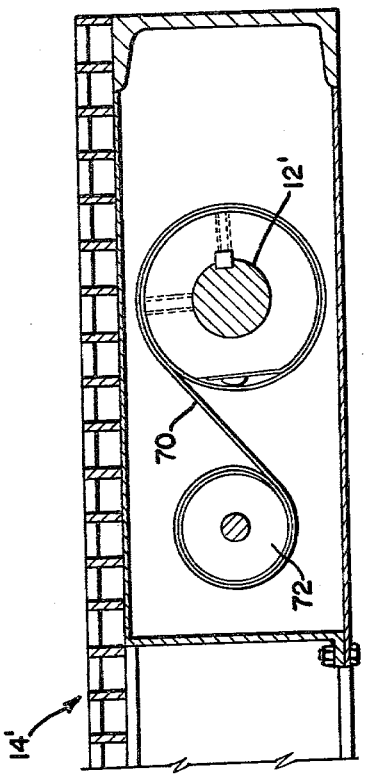
Fig. 4
Fig. 5

SAFETY FLOATING STEP ASSEMBLY FOR PLATFORM

BACKGROUND OF THE INVENTION

The present invention is directed to an adjustable floating step arrangement for pivotal connection to platforms and the like by which personnel may achieve safe access to the top of various height tank trailers, railway tank cars, hopper cars and other carriers requiring access to their tops.

In loading tanker trucks by manually handling a filling hose, for instance, an operator needs to reach the top of the tank of the truck, usually from a platfrom that may be located at a level higher or lower than the top of the tank of the vehicle concerned or adjacent thereto. When the operator attempts to step from the platform onto the top of the tank, he often finds the tank top to have a curved and smooth surface from which he runs the risk of making a misstep, thus possibly slipping and falling to the ground. The risk is significantly increased during inclement weather, as during rain, snow, sleet and freezing weather.

U.S. Pat. No. 4,013,140 discloses one form of step construction by which an operator may obtain access from a platform to the top of vehicles of various heights, such as tanker trucks at hydrocarbon loading stations. The patent discloses a flight of steps, which at one end is pivotally connected to a platform and at the other end is adapted to be moved into contact with and to be supported by the top of the vehicle. The treads of the steps disclosed remain horizontal irrespective of the inclination of the steps by means of a parallelogram linkage. In constructions of the type represented by this patented disclosure, the multiple linkages shown connecting the individual steps in time tend to become rusted due to their exposure to the weather and thus the steps become less freely movable. This construction requires more maintenance to maintain free movement and to preclude or minimize rusting. Although tank tops are fairly sturdy, they can be damaged or punctured if through carelessness or accident the movement of the steps into contact with the tank top should be too fast or the operator should attempt to walk down the steps while the steps have not yet contacted the tank top and the weight of the operator suddenly forces the steps into sudden contact with the tank top.

U.S. Pat. No. 4,013,140 discloses a collapsible step arrangement which may serve as a stairway or step ladder and which also employs a parallel linkage arrangement by which the steps may remain horizontal when in the opened position. This patent also discloses a latching arrangement by which the steps and parallel linkages may be locked in the closed or collapsed position to prevent unintended reopening of the step arrangement.

U.S. Pat. No. 2,498,375 discloses an adjustable ladder employing a parallel linkage arrangement in which cams are used to lock the pivotal steps so that the steps will remain level at the desired adjusted inclination of the ladder.

An object of the invention is to provide a safety floating step assembly by which an operator may have safe access from a platform to the top of the tanks of trucks and the like, the safety floating step assembly being self-supporting and independent of support by and or engagement with the top of such tanks.

Another object of the invention is to provide a safety floating step assembly havng a single pair of spaced apart side-by-side parallel four-bar linkages for supporting a step assembly by which an operator may obtain safe access to the top of tanks from a platform or the like, and which has relatively few moving parts requiring maintenance.

Still another object of the invention is to provide a safety floating step assembly, which is pivotally connected to and from a platform or the like and is provided with a locking arrangement at the location of the pivot for releasably locking the floating step assembly at different positions relative to the height of the tank of the vehicle positioned alongside the platform or other carrier.

Other objects of the invention will become apparent to those skilled in the art to which this invention pertains when reading the disclosure that follows.

SUMMARY OF THE INVENTION

The invention is thus directed to a safety floating step assembly for connection to a platform that extends generally horizontally and provides access to the top of tanks of different height vehicles or other carriers that may be located alongside the platform. By "platform" it is meant any generally horizontally disposed structure which enables an operator to obtain a desired initial height with respect to the top of a tank on a vehicle or other carrier that will be expected to be in position alongside the structure for loading through the top of the tank, or cleaning the tank, or possibly even unloading through the top of the tank. The "platform" could also be the floor of a building adjacent to an access made through the wall of the building with the floating step assembly being pivotally connected to the wall of the building but still located adjacent such floor.

The floating step assembly is self-leveling and is adjustably movable to the same and different horizontal levels of position relative to the platform. It is pivotally connected to the platform by a shaft that is rotatably supported by the platform. A pair of parallel four-bar linkages is secured at one end to the shaft, and at least one step is operatively supported by and from the parallel four-bar linkages at their other end.

The pair of parallel four-bar linkages includes a pair of main support arms that are connected to the shaft for rotation therewith within parallel planes that project generally at right angles relative to the horizontal surface of the platform. The main support arms have extending beyond the end of the platform portions between which a second shaft is connected. The second shaft serves to provide part of the support for suspended pivotal movement therefrom of the step from such outer portions of the main support arms.

A first pair of spaced-apart support members is fixed to the platform and projects at right angles from and above the surface of the platform a predetermined distance; and a second pair of spaced-apart support members is fixed to either side of the suspended step and projects at right angles from and above the step to the same relative predetermined distance as the first pair of spaced-apart support members.

A pair of link members is pivotally connected to and between the upper end portions, respectively, of the first and second pair of spaced-apart support members. Each link member is parallel to one of the main support arms and remains parallel in any position assumed by that one main support arm.

A locking arrangement is provided for the floating step assembly by which the floating step assembly may be releasably locked at any desired horizontal level, and especially to be securely locked against unintended further downward movement while the operator is standing on the step. The locking arrangement involves mounting a toothed gear on and securing to the first-mentioned shaft on which the main support arms are pivotally conneced to the platform. A pawl is releasably biased into selective locking engagement against any selected one of the teeth of the toothed gear, and a movable shipper is adapted to be manually actuated by the operator to disengage the biased pawl from such selective locking engagement when the operator has stepped back onto the platform. The pawl cannot be released while the operator is standing on the step because the amount of friction and moment of force exerted on the pawl by the operator when standing on the step would be too high to be manually accomplished.

The safety floating step assembly may be provided with counterbalancing weights at the innermost end portions of the main support arms, or a constant torque spring motor arrangement may be connected to the first-mentioned shaft by which the main support arms are pivotally mounted.

Each of the main support arms is preferably provided with a fixed annular hub about intermediate the length of the main support arm, and an arrangement is interposed between the interior surface of each of the annular hubs and the exterior surface of the first-mentioned shaft for frictionally radially clamping the main support arms to the first-mentioned shaft for initial alignment of the step relative to the platform and of the main support arms with each other.

BRIEF DESCRIPTION OF THE DRAWINGS

In the drawings:

FIG. 2 is an enlarged elevational view of the pawl and ratchet mechanism, the shipper and the actuating arm;

FIG. 3 is an enlarged side elevational view of the manual release lever and its connection to the shipper for the pawl and ratchet mechanism;

FIG. 4 is a partial plan view in cross-section of the floating step assembly illustrating the hub on one of the main support arms and the radial clamping arrangement between the hub and shaft on which the main support arms are attached; and FIG. 5 is an alternative embodiment illustrating in a partial side cross-sectional elevation view a constant torque spring motor arrangement connected to the shaft from which the main support arms of the floating step assembly are attached.

DESCRIPTION OF THE PREFERRED EMBODIMENT

Figure 1:
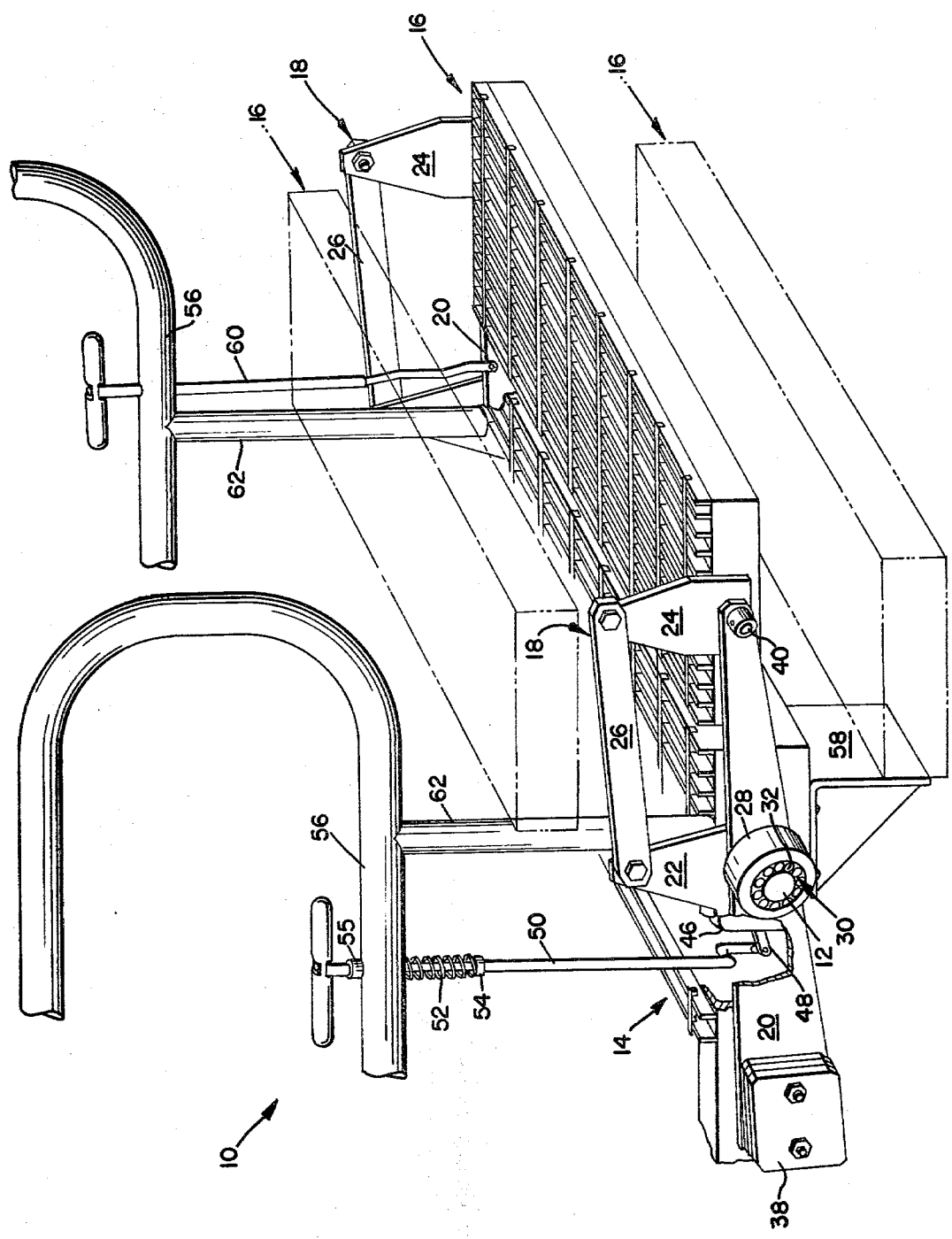
FIG. 1 is an isometric view of the floating step assembly as pivotally connected to a platform, the platform only being shown in part, with a portion of the platform and of the main support arm of the floating step assembly being broken away to illustrate the housing of the pawl and ratchet mechanism and the shipper and manual release lever for the pawl and ratchet mechanism.

In reference to the drawings, the safety floating step assembly 10 is connected to shaft 12 for pivotal movement therewith, the shaft being supported for rotative movement by platform 14. Shaft 12 is of sufficient diameter and strength so as to withstand the torque produced by the moment of force that will be exerted upon it when an operator is standing upon the step 16 that is at a cantilevered position with respect to the shaft and platform.

The step 16 is supported for movement to different horizontal levels of position by a pair of parallel four-bar linkages 18, which include a pair of parallel, spaced-apart main support arms 20 which are connected to the shaft 12 for rotation therewith within parallel planes that project generally at right angles relative to the horizontal surface of the platform; and a first pair of spaced-apart support members 22 fixed to the platform and a second pair of spaced-apart support members 24 fixed to either side of the step 16. The first pair of spaced-apart support members 22 project at right angles from and above the surface of the platform a predetermined distances, and the second pair of spaced-apart support members 24 project at right angles from and above the surface of the step 16 to the same relative predetermined distance as the first pair of spaced-apart support members 22. A pair of link members 26 is pivotally connected to and between the upper end portions, respectively, of the first and second pair of spaced-apart support members 22, 24, with each link member being parallel to one of the main support arms 20 and remaining parallel thereto in any position assumed by that one main support arm. The step 16 is pivotally suspended in part from the first and second pair of spaced-apart support members and the link members.

Each main support arm 20 has about intermediate its length an annular hub 28 fixed thereto. The annular hub is adapted to mount the main support arm upon the shaft 12, and a locking assembly 30 is interposed between the interior surface of the annular hub and the exterior surface of shaft 12 for frictionally radially clamping the main support arm to the shaft 12. The locking assembly, which is partially illustrated, may be of the type that is made by the Ringfeder Corporation in Westwood, N.J. It is a frictional, keyless shaft-hub locking device that provides an easily adjustable and releasable mechanical shrink fit. Torque or axial loads are transmitted by radial clamping pressures and friction between the functional contact surfaces of the locking assembly, shaft and hub. In other words, the locking assembly exerts contact pressures on both the shaft surface and the hub bore. The locking assembly is provided with socket head cap screws 32 which are tightened by a torque wrench, and double tapered thrust rings 34, 36, which are pulled toward each other to exert predetermined radial clamping pressures on slit inner and outer rings (not shown). Disassembly is accomplished by simply releasing the locking screws 32. By use of this locking assembly, the main support arms can be readily and precisely aligned with each other. Also the step may be initially aligned level with the platform. Thus also, torque and axial loads will be safely transmitted regardless of whether or not the main support arms are subjected to static, dynamic or impact loads.

The main support arms 20 may be provided at one end with counterbalancing weights 38 and at the other end, where the portions of the main support arms extend beyond the end of the platform 14, a second shaft 40 extends between the portions and from which step 16 is pivotally suspended in part. The second shaft 40 provides increased stability for the step 16.

A releasable locking arrangement in the form of a pawl and ratchet mechanism or ratchet device, such as made by Lowell Machinery Component Division in Worchester, Massachusetts, is provided for the floating step assembly and includes a toothed gear 42 which is keyed to shaft 12; a spring-biased pawl 44; a housing 46 for the toothed gear and spring-biased pawl; a shipper 48 which is pivotally movable within the housing 46 for movement against the spring-biased pawl to disengage it from its locking engagement with one of the teeth of the toothed gear; and an actuating arm 50 which is pivotally connected to the outer end of the shipper that extends outside the housing 46. The actuating arm 50 is urged into an inoperative position by spring 52, which at its one end presses against a collar 54 mounted on the actuating arm 50 and at its other end may press against a handrail 56 fixed to the platform 14. Collar 55 limits downward movement of the actuating arm. The actuating arm 50 extends through the handrail 56.

The releasable locking arrangement enables an operator to lock the floating step assembly at different horizontal positions which may be above the platform, below the platform or at the same level of the platform.

OPERATION

In operation, the step 16 may be released for movement to different positions when the operator with one hand pulls upwardly on the actuating arm against its spring-bias and with the other hand grasps the handle 60, which is pivotally connected to one of the main support arms 20 and serves to manually control the movement of the floating step assembly. This upward pull is transmitted to the shipper for subsequent disengagement of the pawl from one of the teeth of the toothed gear. The step, as may be noted from FIG. 1, may be moved along an arcuate path until it comes into abutment against a stop member 58 which is attached below the platform, or in abutment against the vertical support 62 for the handrail 56. Upon releasing the actuating arm, the pawl is automatically biased into locking engagement with one of the teeth of the toothed gear 42. When the operator steps from the platform onto the step 16, the ratchet device prevents the step from unintendedly moving downwardly under the weight of the operator.

In the arrangement of the ratchet device illustrated, the spring-biased pawl 44 prevents the toothed gear 42 from rotating in one direction, but the toothed gear may be free to rotate in the opposite direction if the operator wants to move the step 16 to a higher level. If desired, however, a second pawl (not shown) may be disposed on the other side of the shipper 48 from the first pawl to prevent movement in the aforementioned opposite direction without first releasing the locking arrangement.

ALTERNATIVE EMBODIMENT

In reference to FIG. 5, the shaft 12' may have a constant torque spring motor 70 suitably attached thereto, as illustrated, instead of the main support arms 20 being provided with the counterbalancing weights 38, as illustrated in FIG. 1. The one end of the spring motor is connected to shaft 12' and the opposite end of the spring motor is connected to shaft 72.

One example of a constant torque spring motor would be the Ametek Neg'ator constant torque spring motor, made by the Hunter Spring Division of the Ametek Company.

SUMMARY

The floating step assembly as disclosed has a rather simplified construction of fewer moving parts as compared to some of the prior art, thus requiring less maintenance. The construction, however, is rugged enough to serve the purposes intended; it is safe to use; easy to unlock for movement to different horizontal levels; and automatically locks upon release of the actuation lever. The step is self-leveling and can be adjusted in increments by means of the ratchet device so as to be spaced as close to and above the top of the tank of a vehicle as desired, and yet remain out of contact with such tank top without requiring support from the tank top.

The invention has been described in detail with particular reference to preferred embodiments thereof, but it will be understood that variations and modifications can be effected within the spirit and scope of the invention.

I claim:

1. A safety floating step assembly for connection to a platform that extends generally horizontally and provides access to the top of different height vehicles or other carriers that may be located alongside the platform, said floating step assembly being self-leveling and adjustably movable to the same and different horizontal levels of position relative to said platform and comprising:

shaft means extending generally horizontally relative to and rotatably supported by said platform;

step means provided in at least one horizontal plane and being spaced from said platform above, below or adjacent the location of said tops of different height vehicles;

a pair of parallel four-bar linkages operatively connecting said step means to said shaft means extending between said step means and said shaft means and enabling said step means to remain level at any said adjusted horizontal level of position, said pair of parallel four-bar linkages having:

(a) a pair of parallel, spaced-apart main support arms connected to said shaft means for rotation therewith within parallel planes that project generally at right angles relative to the horizontal surface of said platform, said main support arms having portions extending beyond the end of said platform and having a second shaft means connected to and extending between the outer ends of said portions, said step means being pivotally connected to said second shaft means for suspended pivotal movement from said outer ends of said main support arms;

(b) a first pair of spaced-apart support members fixed to said platform and projecting at right angles from and above the surface of the platform a predetermined distance, and a second pair of spaced-apart support members fixed to either side of said step means and projecting at right angles from and above the step means to the same relative predetermined distance as said first pair of support members; and (c) a pair of link members pivotally connected to and between the upper end portions, respectively, of said first and second pair of spaced-apart support members, each link member being parallel to one of the main support arms and remaining parallel in any position assumed by said main support arms; and means mounted on said first-mentioned shaft means for releasably locking said first-mentioned shaft means and said main support arms at different rotated positions of adjustment with respect to said platform.

2. A safety floating step assembly as defined in claim 1, wherein said means for releasably locking said first-mentioned shaft means and said main support arms comprises a toothed gear means mounted on and fixed to said first-mentioned shaft, pawl means biased into selective locking engagement against any selected one of the teeth of said gear means, and a movable shipper means adapted to disengage said biased pawl means from said selective locking engagement.

3. A safety floating step assembly as defined in claim 1, wherein said pair of main support arms each has at the opposite end from said outer end of said portion counterbalancing weight means.

4. A safety floating step assembly as defined in claim 1, wherein said first-mentioned shaft has connected thereto constant torque spring motor means for counterbalancing said main support arms.

5. A safety floating step assembly as defined in claim 1, wherein each of said pair of main support arms has an annular hub fixed thereto about intermediate the length of said main support arm, and means is provided for interposition between the interior surface of each said annular hub and the exterior surface of said first-mentioned shaft means for frictionally radially clamping said main support arms to said first-mentioned shaft means.

* * * * *